Figure 1:
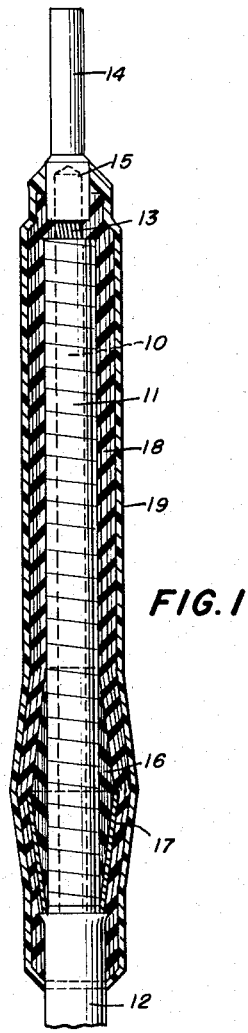

March 31, 1964  P. L. BETZ ETAL  3,127,291
HERMETIC INSULATING STRUCTURES FOR ELECTRIC
CABLE JOINTS AND TERMINATIONS
Filed Feb. 6, 1959

INVENTORS
PAUL L. BETZ
OSCAR W. LUSBY

BY Cameron, Kerkam & Sutton

ATTORNEYS

United States Patent Office 3,127,291
Patented Mar. 31, 1964

3,127,291
HERMETIC INSULATING STRUCTURES FOR ELECTRIC CABLE JOINTS AND TERMINATIONS
Paul L. Betz and Oscar W. Lusby, Baltimore, Md., assignors to Baltimore Gas and Electric Company, Baltimore, Md., a corporation of Maryland
Filed Feb. 6, 1959, Ser. No. 791,692
12 Claims. (Cl. 156—49)

This invention relates to a method and means for hermetically sealing the insulation at the ends of or joints between electric cables, and is particularly directed to the provision of both a covering for the cable insulation having adequate electrical and mechanical properties for use between the conducting elements, and a hermetic barrier capable of preventing the entrance of oil and moisture into the cable and the loss of oil from the cable.

The invention may be employed in either terminating or joining cables, a cable joint being regarded as the equivalent of two terminations joined end-to-end. Electrically, cable joints are simpler in some respects than terminations because the latter involve exposed high voltage members. Terminations and joints also generally involve different spacings between the high voltage conductor and the cable sheath, as well as different locations, configurations and extent of grounded surfaces. However, these differences are embodied in standard designs of terminations and joints; and it will be understood that the present invention may be employed in conjunction with standardized practices, except in those instances referred to hereinafter where a material departure from standardized practice may be desirable.

In underground electric power distribution systems, oil-filled accessories have long been used for joining and terminating high voltage cables. However, the cost of reservoirs, fittings and mounting facilities for oil-filled accessories is substantial, as is the expense of periodic inspection and maintenance of the oil level. For reasons of economy, efforts have been made to use joints and potheads filled with solid or semi-solid compounds instead of the oil-filled accessories, but failures have occurred with these installations, especially when used in underground systems distributing power at voltages on the order of 33,000 volts and when the joints and termination were made in the field rather than in the shop.

It is therefore one of the objects of the present invention to provide an improved form of insulating structure for cable joints and terminations which can be readily installed in the field by regular construction personnel, and which will perform as satisfactorily as the standard oil-filled accessories but at substantial savings in both original cost and maintenance.

Another object is to provide a novel hermetic insulating structure having the following characteristics: (a) high break-down voltage strength; (b) low power loss; (c) dielectric constant approximately that of oil-impregnated paper insulation; (d) ability to withstand electric discharges such as corona; (e) high adherence to materials usually employed in electric cable construction, such as copper, metallic and synthetic sheathing materials, and rubber, rubber-like and oil-impregnated paper insulation; (f) high adherence under temperatures encountered in service; (g) imperviousness to oil and water; (h) controlled flexibility to avoid brittleness at low temperatures; and (i) suitability and ease of field application.

These and other objects will appear more fully upon consideration of the following detailed description of various embodiments of the invention, including the two structures which have been illustrated in the accompanying drawing. It is to be expressly understood, however, that this description and drawing are exemplary only and are not to be construed as defining the limits of the invention, for which latter purpose reference should be had to the appended claims.

Figure 2:
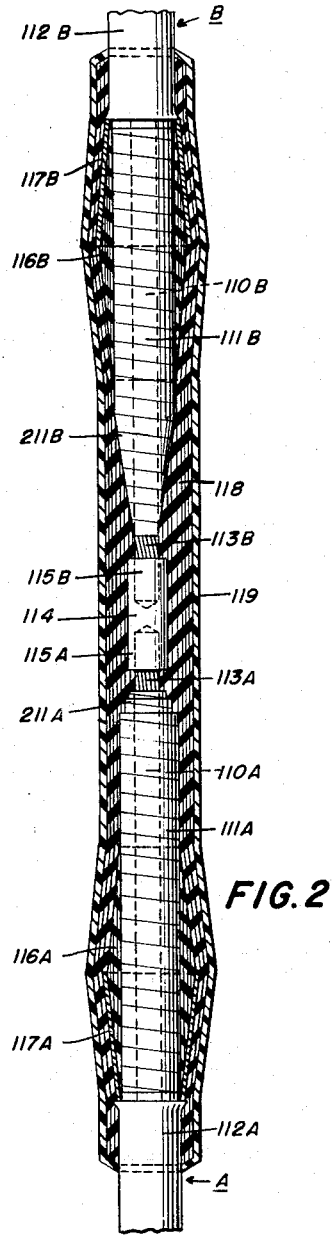

In the drawing:
FIG. 1 is a longitudinal sectional view, with some of the parts shown in full, of one form of cable termination constructed in accordance with the present invention; and
FIG. 2 is a view similar to FIG. 1 of a cable joint embodying the invention.

Referring now to FIG. 1, the invention is there illustrated as applied to the construction of a termination for a 33,000 volt cable having a high voltage conductor 10 consisting of a bundle of strands of wire, a wrapping of oil-impregnated paper tape 11 enclosing conductor 10 and forming a cylinder of insulation commonly referred to as factory insulation, and a metallic cable sheath 12. In making the termination, a portion of cable sheath 12 is cut back to expose the paper insulation 11, and at the end of the cable a portion of the paper insulation is removed to expose a short length of conductor 10, as indicated at 13. The exposed end 13 of the conductor is then inserted into the cupped portion 15 of a terminal member 14, and a joint of low electrical resistance between these members is provided in any suitable manner, as by soldering them together or mechanically indenting cupped portion 15.

In the embodiment illustrated, the portion of factory insulation 11 immediately adjacent the end of cable sheath 12 is surrounded by a stress relief cone 16 of conventional construction, consisting of a double cone of insulation, such as a wrapping of varnished cambric tape, which extends outwardly from the end of sheath 12 over approximately one-third of the length of the exposed paper insulation 11. The portion of stress relief cone 16 between its point of maximum diameter and the end of sheath 12 is provided with a wrapping of metalized braid 17 which is electrically connected to sheath 12, as by soldering. The outer edge of braid 17 is spaced from the exposed portion 13 of conductor 10 by a distance corresponding to the electrical creepage distance which, in the case of a 33,000 volt termination, is normally on the order of 16 inches.

In order to properly insulate the conducting elements of the termination thus far described and to prevent the entrance of oil or moisture into the cable and the leakage of oil outwardly from the oil-impregnated factory insulation 11, the present invention provides a novel form of hermetic insulating structure 18 which consists essentially of a wrapping of relatively open-meshed synthetic fiber tape impregnated with an epoxy resin mixture which cures to a relatively hard, tough solid. In forming the structure, the resin is applied to the inside surface of the tape by brushing or in any other suitable manner as the tape is wrapped on the cable-end under sufficient tension to ensure that the resin is forced through the pores of and thoroughly saturates the tape, and to also compress the underlying factory insulation. It will be obvious that formation of the structure in this manner requires that the resin be applied in liquid form to each portion of the tape just before that portion of the tape is wrapped around the cable-end so that the wrapping operation is performed while the resin is still fluid, before any appreciable curing of the resin occurs.

The insulating structure 18 completely covers the exposed portion of the cable between the end of sheath 12 and cupped portion 15 of terminal 14, and also extends over portions of sheath 12 and cupped portion 15 and forms hermetic seals with these elements which isolate the cable components from the surrounding environment. In order to ensure tight sealing of the resin-impregnated tape to the sheath 12 and cupped portion 15 of terminal 14, the surfaces of the latter members are first cleaned with a suitable solvent and then abraded, as with garnet paper, to provide oxide-free roughened surfaces which produce a stronger bond between the resin and the metal. Insulating structure 18 may be built up to any desired thickness, it having been found, for example, that four half-lapped wraps of the resin-impregnated tape, i.e., eight layers, finished with a single butt wrapped outer layer provides a hermetic seal having adequate mechanical properties and insulation strength for voltages in excess of 33,000 volts. Such a structure will have a thickness on the order of 0.25 inch.

After the hermetic insulating structure 18 has been formed, it is provided with an outer covering 19, the character and function of which will differ depending upon the use that is to be made of the prepared cable-end. In certain applications, it is desirable that the outer surface of insulation 18 be composed of a thin layer of epoxy resin over the impregnated tape. In this case the covering 19 may be applied in the form of a layer of tape, such as polyethylene tape, which holds the resin in place during the curing period and ensures that the impregnated tape of insulation 18 is completely covered with resin. Since polyethylene tape is not wetted by the resin and does not adhere thereto, it may be removed, if desired, when the resin has completely cured. However, when the termination is to be enclosed in a porcelain or other weather-proof pothead, the covering 19 of polyethylene tape may be left in place, in which event the space between the hermetically insulated cable-end and the wall of the pothead is preferably filled with oil of low viscosity heated to a temperature of approximately 140° F., sufficient space being left in the pothead for expansion under operating conditions. In an installation of this character, the heat of the oil accelerates and controls the rate of curing of the resin, a particularly desirable advantage when the installation is made in cold weather.

For applications wherein the termination is not protected from the weather, it may be desirable to include a filler in the resin formulation which reduces the tendency toward surface deterioration under the influence of voltage stress and atmospheric contamination. Several such fillers are known to the art, one of them being aluminum hydrate $(Al_2O_3 \cdot 3H_2O)$ which has been used for this purpose.

Where desired, the epoxy resin employed in hermetic insulation 18 may be formulated without a filler material of the character above described and the outer coating 19 may take the form of a layer of epoxy resin incorporating the desired filler. In this instance, the coating material is applied before the epoxy resin impregnating the tape of insulation 18 has cured to an appreciable extent, so as to ensure that the resin in insulation 18 and coating 19 will form a unitary structure. When coating 19 is thus formed of resin, it preferably has the consistency of putty and is applied over the resin-impregnated tape insulation 18 by spreading with a spatula or putty knife, the outer surface being smoothed to facilitate self-cleaning under outdoor operating conditions.

As indicated above, the present invention is applicable to cable joints as well as cable terminations, a joint between two cables being essentially the same as two terminations connected end-to-end. By way of example, FIG. 2 shows a construction embodying the invention for hermetically insulating the joint between cable A which may have factory insulation 111A of oil-impregnated paper and cable B having rubber insulation 111B.

In preparing the cable ends for joining, the sheaths 112A and 112B are cut back to expose the factory insulation 111A and 111B, and at the outer end of each cable the insulation is removed to expose portions of conductors 110A and 110B, as at 113A and 113B, respectively. For low voltage applications, the factory insulation may be cut back squarely, as shown in FIG. 1. However, for voltages higher than about 2,000 volts, the insulation should be stepped as at 211A for paper insulation, and penciled or tapered as at 211B for compounded insulations such as rubber.

Cables A and B are electrically connected by means of a connector 114 having cupped ends 115A and 115B into which the exposed conductor ends 113A and 113B are inserted, a low resistance electrical connection between the conductors and connector 114 being provided in any suitable manner, as by soldering or mechanically indenting cupped portions 115A and 115B. When the cables are adapted to operate at voltages of about 13,000 volts or more, stress relief cones 116A and 116B are provided adjacent cable sheaths 112A and 112B, respectively, each of said cones comprising added insulation, such as varnished cambric tape, which starts at the cable sheath and provides a double cone of insulation extending over a portion of the factory insulation. The portions of the stress relief cones between the points of maximum thickness thereof and the adjacent ends of cable sheaths 112A and 112B are covered with metalized braids 117A and 117B, respectively, which are electrically connected to the sheaths if the latter are metallic, or to the metalized shielding tapes (not shown in FIG. 2) which cover the factory insulation in non-metallic sheathed cables.

As in the case of the cable termination of FIG. 1, the present invention provides a hermetic insulating structure 118 for the cable joint of FIG. 2, which structure extends over and between cable sheaths 112A and 112B, and covers the stress relief cones 116A and 116B, the exposed factory insulations 111A and 111B, the exposed portions of cable conductors 113A and 113B, and the surface of connector 114. In accordance with the invention, insulating structure 118 is formed by applying to the thus prepared joint, under tension, a wrapping of relatively open-meshed synthetic fiber tape which is impregnated with an epoxy resin formulation in the manner previously described with reference to the cable termination of FIG. 1, i.e., by impregnating the tape with liquid resin prior to the wrapping operation and then wrapping the tape around the joint, under tension, before the resin has cured to an appreciable extent. Before applying the resin-impregnated tape, the sheath ends 112A and 112B are preferably cleaned with a suitable solvent and are abraded, as with garnet paper, so as to present to insulating structure 118 clean roughened surfaces which promote hermetic sealing at these locations.

In the case of a cable joint such as that shown in FIG. 2, the outer covering 119 which surrounds insulating structure 118 is normally formed of metalized braid electrically connected to the cable sheaths 112A and 112B if the latter are metallic, or to the shielding tapes in the case of non-metallic sheathed cables, according to standard practice. If desired, covering 119 may be protected by an additional wrapping of resin-impregnated tape or a coating of epoxy resin incorporating a filler and a non-melting silicone dielectric paste of the character hereinafter described. When the joint is formed between metal sheathed cables, it may also be enclosed in a metal sleeve having its ends connected to the cable sheaths in accordance with conventional practice. None of these optional additional protective coverings is shown in FIG. 2.

In the joint illustrated, wherein cable A has oil-impregnated paper insulation 111A and cable B has rubber insulation 111B, the hermetic insulating structure 118 not only prevents the entrance of moisture into the cables and the loss of cable oil therefrom, but also protects the rubber insulation of cable B from damage by oil that might seep out of cable A.

The tape and the epoxy resin mixture comprising the hermetic insulating structure of the present invention must have certain characteristics in order to enable construction in the field by regular power company installation personnel of cable joints and terminations having the electrical and mechanical properties outlined in the introductory portion of this specification. In general, the resin formulation should comprise a low viscosity epoxy resin, a modifier to reduce brittleness and an activator, and should be curable at atmospheric temperatures to a relatively hard, tough solid. The tape should be one which is readily wetted by, but does not deteriorate in the presence of, epoxy resin, and should be relatively open-meshed so as to form a void-free composite with the resin. It must have good dielectric properties, a low affinity for moisture, and high resistance to chemicals, solvents and weathering, and should be strong enough to permit it to be wrapped under sufficient tension to force the resin through the pores of the tape and to suitably compress the underlying factory insulation of the cable during construction of the joint or termination. The resin should also be capable of bonding tightly to all elements of the cable, particularly the sheath.

THE TAPE

It has been found that a synthetic fiber tape woven from spun acrylic fiber consisting of at least 80% polymerized acrylonitrile is well suited for use in connection with the present invention. A preferred form of tape which has been used extensively in practicing the invention consists of a plain or twill weave of the spun acrylic fiber marketed commercially under the trademark Orlon, having a count of approximately 40 x 40 and weighing approximately 6 ounces per square yard, the width of the tape being 1.5 inches. As used hereinafter, the term "preferred tape" will refer to a material approximating these specifications.

THE EPOXY RESIN

The preferred epoxy resins of the present invention include as their main component the compound resulting from the reaction of epichlorohydrin with bisphenol-A, which may be represented by the following formula:

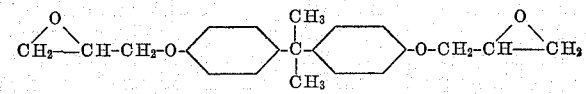

A small quantity of a reactive diluent, such as phenyl glycidyl ether, for example, may be included in the liquid epoxy resin to reduce its viscosity. Phenyl glycidyl ether is represented by the formula:

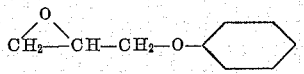

The liquid epoxy resins which have been found useful in practicing the invention are those having from 175 to 210 grams of resin per gram equivalent of epoxide, a viscosity of from 1,000 to 15,000 centipoises at 25° C., and a molecular weight of from 340 to 400.

THE MODIFIER

Since epoxy resins of the type above specified are brittle when cured with the preferred forms of activators, it is desirable to add to the resin a modifier in order to reduce brittleness and to obtain a tough resin. The preferred modifier reacts with the resin and becomes an integral part of the molecule.

Modifiers that may be used in carrying out the invention include polysulfide polymers, polyamides, certain of the polyesters and modified polyamines. Liquid polysulfide polymers have been found to best meet these requirements, the preferred type having a viscosity of from 700 to 1,200 centipoises at 25° C. and a molecular weight of approximately 1,000. The liquid polymer marketed commercially under the trademark Thiokol LP-3 is representative of the preferred type of modifier.

THE ACTIVATOR

Activators suitable for use in the epoxy resin formulations of the present invention should provide a fast cure at room temperature, be readily miscible, and produce a moderately tough resin with a relatively high heat distortion point. It has been found that primary aliphatic amines, such as diethylene triamine, triethylene tetramine and modified polyamines, meet these requirements. The preferred activator is triethylene tetramine, used in an amount equal to approximately 12% by weight of the epoxy resin used in the formulation. Since the pot life of the mixed resin is relatively short, the activator is added to the epoxy resin system in the field at the time of use.

RESIN FORMULATIONS

Suitable resin formulations for impregnating acrylic fiber tape in accordance with the present invention will be obtained within the following composition ranges:

| | Parts by weight |
|---|---|
| Epoxy resin | 70 to 80 |
| Modifier | 10 to 16 |
| Activator | 6 to 10 |

When desired, the resin formulation may be modified by the addition of fillers which reduce the cost, raise the heat distortion temperature and increase the viscosity of the resin mixture. Fillers also serve the useful purpose of reducing shrinkage during curing. Fillers should be materials which do not adversely affect, but preferably improve the electrical properties of the insulating structure, and which do not permit the absorption of water or oils. Certain metallic oxides and hydrates have been used as fillers, aluminum hydrate being a preferred material which meets all requirements satisfactorily and is compatible with the epoxy resin. Generalized formulations using fillers are as follows:

| | Parts by weight |
|---|---|
| Epoxy resin | 40 to 55 |
| Modifier | 4 to 7 |
| Activator | 3 to 7 |
| Filler | 35 to 50 |

The resin formulation may be further modified to produce a viscous plastic material suitable for application to the surface of the hermetic insulation of the joint or termination so as to provide, upon curing, a hard, smooth and highly water resistant coating. This modification involves the use of fillers to increase the viscosity, together with a non-melting silicone dielectric paste to improve the surface characteristics and workability. A silicone dielectric paste suitable for this use is available commercially under the name Dow Corning 5 Compound. A generalized formulation for the plastic coating material provided by the present invention is as follows:

| | Parts by weight |
|---|---|
| Epoxy resin | 25 to 35 |
| Modifier | 3 to 7 |
| Activator | 2 to 4 |
| Fillers | 40 to 60 |
| Silicone dielectric paste | 7 to 12 |

If desired, the fillers used in the plastic coating material may include a small amount of thixotropic agent, such as finely divided silica, to the extent of about 3 to 10 parts by weight. A suitable thixotropic agent is available commerically under the trademark Cab-o-sil.

As illustrative of specific resin formulations, the following are preferred compositions for applying the invention to particular insulating structures, as hereinafter described:

Formula I.—Basic Epoxy Resin

| | Parts by weight |
|---|---|
| Epoxy resin (viscosity approximately 1,000 centipoises at 25° C.) | 80 |
| Modifier (Thiokol LP-3) | 10 |
| Activator (triethylene tetramine) | 10 |

Formula II.—Epoxy Resin With Filler

| | Parts by weight |
|---|---|
| Epoxy resin (viscosity approximately 1,000 centipoises at 25° C.) | 48 |
| Modifier (Thiokol LP-3) | 6 |
| Activator (triethylene tetramine) | 6 |
| Filler (aluminum hydrate) | 40 |

*Formula III–A.—Resin Coating Material*

| | Parts by weight |
|---|---|
| Epoxy resin (viscosity approximately 12,000 centipoises at 25° C.) | 30 |
| Modifier (Thiokol LP–3) | 5 |
| Activator (triethylene tetramine) | 3.5 |
| Filler (aluminum hydrate) | 51 |
| Silicone dielectric paste | 10.5 |

*Formula III–B.—Resin Coating Material*

| | Parts by weight |
|---|---|
| Epoxy resin (viscosity approximately 12,000 centipoises at 25° C.) | 32 |
| Modifier (Thiokol LP–3) | 6.5 |
| Activator (triethylene tetramine) | 4 |
| Filler (aluminum hydrate) | 44 |
| Thixotropic agent (Cab-o-sil) | 3.5 |
| Silicone dielectric paste | 10 |

TYPICAL TERMINATIONS AND JOINTS

To illustrate how the invention may be applied, the following are typical examples of various combinations of components used in the construction of terminations and joints.

EXAMPLE 1.—TERMINATION FOR PAPER INSULATED-LEAD SHEATHED CABLE FOR USE IN A PORCELAIN POTHEAD

To terminate a paper insulated-lead sheathed cable when the termination is to be installed in a porcelain pothead, the insulating structure is formed as shown in FIG. 1 using acrylic fiber tape of the preferred specifications and impregnating it, as the termination is wrapped, with the basic epoxy resin formulation of Formula I. Use of a stress relief cone is dependent upon the operating voltage. The resin-tape insulation 18 is then covered with a wrapping 19 of polyethylene tape, whereupon the termination may be inserted immediately into the porcelain pothead and the latter filled with a low viscosity cable oil at a temperature of approximately 140° F., leaving a small space to provide for oil expansion. Alternatively, insertion of the cable-end into the pothead may be delayed for a period of several hours, until the resin has partially cured, so that the outer covering of polyethylene tape may be removed before completion of the termination.

EXAMPLE 2.—TERMINATION FOR CABLE HAVING PAPER OR OTHER INSULATION AND METALLIC OR INSULATING SHEATH—NO POTHEAD (a) A termination for a cable which is adapted for indoor-outdoor use without a pothead may be constructed as described above in Example 1 except that, instead of covering the insulation 18 with a wrapping of polyethylene tape, a resin coating 19 of the formulation specified above in either Formula III–A or Formula III–B is applied to the surface of the resin-impregnated tape insulation so as to provide a hard, smooth, weather-proof covering.

(b) When the no-pothead termination is for indoor use only, it may be constructed in the same manner as the termination of Example 1, including the optionally removable outer covering of polyethylene tape.

(c) When the no-pothead termination is to be used outdoors, the insulating construction of Example 1 is again followed except that the preferred tape is impregnated with the epoxy resin and filler formulation of Formula II.

EXAMPLE 3.—JOINT BETWEEN PAPER INSULATED-LEAD SHEATHED CABLES

To form a joint between two paper insulated, lead sheathed cables, the joint is constructed as shown in FIG. 2, the factory insulation being either square-cut or stepped in accordance with standardized joint designs, and stress relief cones being used or not depending upon the operating voltage. In such a joint, acrylic fiber tape of the preferred specifications is impregnated with the basic epoxy resin of Formula I, but the outer covering of the joint (119 in FIG. 2) is made of metalized braid electrically connected to the cable sheaths according to standard practice. If desired, the metalized braid may be provided with a protective covering formed of either the preferred tape impregnated with the basic epoxy resin of Formula I, or resin coating material of Formula III–A or Formula III–B. Alternatively, the joint may be enclosed in a metal sleeve interconnecting the cable sheaths in the manner well known to the art.

EXAMPLE 4.—JOINT BETWEEN PAPER INSULATED-LEAD SHEATHED SHIELDED CABLE AND RUBBER INSULATED-NEOPRENE SHEATHED SHIELDED CABLE

A joint between a paper insulated, lead sheathed, shielded cable and a rubber insulated, neoprene sheathed, shielded cable may be made in the same manner as in Example 3 except that the epoxy resin of Formula II may be used to impregnate the fiber tape and the resin-tape insulating structure is provided with an outer covering of metalized braid electrically conected to the shielding tape of each cable, and the metalized braid may, if desired, be provided with a protective covering consisting of the preferred tape impregnated with the epoxy resin of Formula II.

EXAMPLE 5.—JOINT BETWEEN RUBBER INSULATED-NEOPRENE SHEATHED SHIELDED CABLES

To form a joint between two rubber insulated, neoprene sheathed, shielded cables, the joint may be made in the same maner as in Example 4 except that the factory insulation is either square-cut or tapered, rather than stepped, in accordance with standardized joint designs.

The preferred acrylic fiber tape and epoxy resin insulation of the present invention has a dielectric constant of approximately 3.9 to 4.2, a dissipation factor of approximately 2.3%, and a voltage break-down strength of approximately 600 volts per mil. If the weight of the tape is reduced from approximately 6 ounces per square yard to about 2.3 ounces per square yard, more layers of tape are required to produce a given insulation thickness, but the voltage break-down strength will be increased to approximately 1,100 volts per mil.

Over-voltage life tests have been made on terminations constructed as shown in FIG. 1 for 33,000 volt service wherein the insulating structure comprised the preferred acrylic fiber tape above described, the basic epoxy resin of Formula I and an outer covering of polyethylene tape, the thickness of the insulation being about 0.25 inch. In tests which continued over periods ranging up to 7 months with an applied voltage equal to 2.5 times the operating voltage, no failures of the hermetic insulation occurred. Since it is usual to estimate the probable service life at operating voltage from the over-voltage tests as equal to the product of the time for failure at test voltage and the sixth power of the ratio of test to operating voltages, the expected minimum service life of the terminations thus tested would range from 115 to 140 years.

Impulse voltage tests were also made on 33,000 volt terminations of the construction illustrated in FIG. 1, using the standard 1.5 x 40 microsecond wave. When the terminations were placed in a porcelain pothead with oil surrounding the hermetic insulation, the withstand and flash-over voltages were 275,000 volts and 300,000 volts, respectively. Without oil in the pothead, the withstand and flash-over voltages were 185,000 volts and 200,000 volts, respectively.

In tests made to determine the adherence of epoxy resin-impregnated acrylic fiber tape to lead and copper at elevated temperatures and pressures, the results showed that the bond between the insulation and the metal elements of the cable is more than adequate from the standpoints of structural strength and hermetic sealing properties under the conditions encountered in electric cable joints and terminations for operating voltages on the order of 33,000 volts.

There is thus provided by the present invention a new and improved method and means for hermetically sealing and insulating the joints and terminations of electric cables, particularly those employed in underground distribution systems operating at relatively high voltages where high breakdown voltage strength, low power loss, ability to withstand electric discharges such as corona and imperviousness to oil and water are required. Although several structural embodiments of the invention have been described herein, together with examples of the preferred tape and resin formulations used in making the insulating structure, it is to be expressly understood that these disclosures are intended for purposes of illustration only, and that the invention is capable of embodiment in other forms. Various modifications, which will now suggest themselves to those skilled in the art, may be made in the mechanical construction and compositions of the elements of the joints and terminations, and in the method by which they are formed, without departing from the inventive concept. Reference is therefore to be had to the appended claims for a definition of the limits of the invention.

What is claimed is:

1. A method of hermetically sealing and insulating cable joints and terminations comprising the steps of coating a permeable synthetic fiber tape with a liquid polymerizable epoxy resin material, said tape being wettable by said epoxy resin material and being free of polymerized material prior to coating, and wrapping the coated tape in a plurality of overlapped layers around the components of the cable to be insulated, said wrapping being carried out after the coating step and before appreciable polymerization of said epoxy resin material occurs.

2. A method of hermetically sealing and insulating cable joints and terminations comprising the steps of coating a permeable synthetic fiber tape with a liquid polymerizable epoxy resin material by brushing said material onto one side of said tape, said tape being wettable by said epoxy resin material and being free of polymerized material prior to coating, and wrapping the coated tape in a plurality of overlapped layers around the components of the cable to be insulated with the coated side of said tape facing said components, the wrapping being carried out before appreciable polymerization of said epoxy resin material occurs and under sufficient tension to force said material into the pores of and thereby saturate said tape as each layer of the wrapping is laid down.

3. A method as defined in claim 1 including the additional step of covering the completed coated tape wrapping with a plastic coating material containing an epoxy resin and a filler.

4. A method of hermetically sealing and insulating cable joints and terminations comprising the steps of coating the inside surface of a permeable acrylic fiber tape with a liquid polymerizable epoxy resin formulation and wrapping the coated tape around the components of the cable to be insulated before said liquid epoxy resin formulation polymerizes to any appreciable extent, the said tape being wettable by said epoxy resin formulation and being free of polymerized material prior to application of the resin formulation thereto, the wrapping being performed under sufficient tension to force the resin formulation into the pores of and thereby saturate the tape as each layer of the wrapping is laid down, said epoxy resin formulation subsequently polymerizing to a relatively hard, tough solid.

5. A method as defined in claim 4 including the additional step of covering the completed resin-saturated wrapping tape with a plastic coating containing an epoxy resin and a filler.

6. A method of hermetically sealing and insulating cable joints and terminations comprising the steps of preparing a liquid polymerizable epoxy resin formulation containing from about 40 to about 80 parts by weight of an epoxy resin, from about 4 to about 16 parts by weight of a modifier, and from about 3 to about 10 parts by weight of an activator, coating a permeable acrylic fiber tape with said resin formulation, wrapping said coated tape around the components of the cable to be insulated before said resin coating polymerizes to any appreciable extent, said tape being free of polymerized material prior to application thereto of said epoxy resin formulation, and applying sufficient tension to said tape as it is wrapped to force the resin formulation into the pores of and thereby saturate the tape, said resin formulation subsequently polymerizing to a relatively hard, tough solid.

7. A method of hermetically sealing and insulating cable joints and terminations comprising the steps of preparing a liquid polymerizable epoxy resin formulation containing from about 40 to about 80 parts by weight of an epoxy resin, from about 4 to about 16 parts by weight of a modifier, and from about 3 to about 10 parts by weight of an activator, coating one side of a permeable acrylic fiber tape with said epoxy resin formulation, said tape being free of polymerized material prior to the coating step, and wrapping the coated tape in a plurality of overlapped layers around the components of the cable to be insulated with the coated side of said tape facing said components and before appreciable polymerization of said epoxy resin formulation occurs.

8. A method of hermetically sealing and insulating a joint between insulated, sheathed electrical cables of the type wherein portions of the cable sheaths and insulation are removed to expose portions of said insulation and the cable conductors, respectively, and the exposed ends of said conductors are connected by a metallic connector, comprising the steps of coating a permeable synthetic fiber tape with a liquid polymerizable epoxy resin material, said tape being wettable by said epoxy resin material and being free of polymerized material prior to coating, wrapping the coated tape in a plurality of overlapped layers around the exposed portions of said cable insulation, conductors and connector, said epoxy resin material being applied to said tape immediately prior to the wrapping step and the wrapping being carried out before appreciable polymerization of said material occurs, extending the wrapping over the end portions of the cable sheaths, and sealing said wrapping to said sheaths through said resin.

9. A method as claimed in claim 8 including the additional steps of applying a covering of electrically conducting braid to the outer surface of said wrapping, electrically connecting said braid to said cable sheaths, and applying to said braid a protective covering containing an epoxy resin.

10. A method as claimed in claim 9 wherein the protective covering consists of a coating of plastic material containing an epoxy resin and a filler.

11. A method of hermetically sealing and insulating a termination of a sheathed, insulated electric cable of the type wherein portions of the cable sheath and insulation are removed to expose portions of said insulation and the cable conductor, respectively, and the exposed end of said conductor is connected to a metallic terminal member, comprising the steps of coating a permeable synthetic fiber tape with a liquid polymerizable epoxy resin material, said tape being wettable by said epoxy resin material and being free of polymerized material prior to coating, wrapping the coated tape in a plurality of overlapped layers around the exposed portions of said cable insulation and conductor, said epoxy resin material being applied to said tape immediately prior to the wrapping step and the wrapping being carried out before appreciable polymerization of said material occurs, extending the wrapping over the end portion of said cable sheath and a portion of said terminal member, and sealing said wrapping to said sheath and terminal member through said resin.

12. A method as defined in claim 11 including the additional step of applying to the outer surface of said wrapping a coating of plastic material containing an epoxy resin and a filler.

References Cited in the file of this patent
UNITED STATES PATENTS

| | | |
|---|---|---|
| 2,219,910 | Webb et al. | Oct. 29, 1940 |
| 2,287,201 | Scott et al. | June 23, 1942 |
| 2,386,185 | Beaver et al. | Oct. 9, 1945 |
| 2,442,193 | Brazier | May 25, 1948 |
| 2,523,313 | Lee | Sept. 26, 1950 |
| 2,695,853 | Foreit | Nov. 30, 1954 |
| 2,805,472 | Botts et al. | Sept. 10, 1957 |
| 2,828,236 | West | Mar. 25, 1958 |
| 2,836,744 | Clawson | May 27, 1958 |
| 2,847,343 | Kohn | Aug. 12, 1958 |
| 2,922,734 | Kohn et al. | Jan. 26, 1960 |
| 2,976,889 | Cannady | Mar. 28, 1961 |

UNITED STATES PATENT OFFICE
CERTIFICATE OF CORRECTION

Patent No. 3,127,291                                    March 31, 1964

Paul L. Betz et al.

It is hereby certified that error appears in the above numbered patent requiring correction and that the said Letters Patent should read as corrected below.

Column 1, line 11, for "toa" read -- to a --; column 9, line 74, for "wrapping tape" read -- tape wrapping --.

Signed and sealed this 21st day of July 1964.

(SEAL)

Attest:

ESTON G. JOHNSON                               EDWARD J. BRENNER
Attesting Officer                                    Commissioner of Patents